United States Patent
Beltramo et al.

(10) Patent No.: US 8,631,649 B2
(45) Date of Patent: Jan. 21, 2014

(54) ENGINE EXHAUST COMPONENT

(75) Inventors: Joel John Beltramo, West Bloomfield, MI (US); Keith A. Campbell, Canton, MI (US); Erich James Nowka, Ann Arbor, MI (US); Ray Host, Mt. Clemens, MI (US); Robert Ralph Iorio, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

(21) Appl. No.: 13/112,741

(22) Filed: May 20, 2011

(65) Prior Publication Data

US 2012/0291417 A1   Nov. 22, 2012

(51) Int. Cl.
*F01N 5/02* (2006.01)

(52) U.S. Cl.
USPC ............ 60/320; 60/274; 60/298; 60/299; 60/321; 60/323

(58) Field of Classification Search
USPC ........... 60/274, 298, 299, 310, 320, 321, 323, 60/324
See application file for complete search history.

(56) References Cited

U.S. PATENT DOCUMENTS

| | | | | |
|---|---|---|---|---|
| 3,851,470 A * | 12/1974 | Kaufmann, Jr. | ............... | 60/298 |
| 5,109,668 A * | 5/1992 | Lindstedt | ........................ | 60/310 |
| 5,212,949 A * | 5/1993 | Shiozawa | ........................ | 60/298 |
| 5,873,330 A | 2/1999 | Takahashi et al. | | |
| 6,397,589 B1 * | 6/2002 | Beson et al. | ..................... | 60/320 |
| 6,582,263 B1 * | 6/2003 | Jaeger et al. | ................ | 440/89 C |
| 6,644,024 B1 * | 11/2003 | Powers et al. | .................. | 60/320 |
| 7,803,026 B2 * | 9/2010 | McKinney | ................. | 440/89 R |
| 8,146,543 B2 * | 4/2012 | Kuhlbach et al. | ...... | 123/41.82 R |

* cited by examiner

*Primary Examiner* — Binh Q Tran
(74) *Attorney, Agent, or Firm* — Julia Voutyras; Alleman Hall McCoy Russell & Tuttle LLP

(57) ABSTRACT

An engine exhaust component is provided. The engine exhaust component may include a plurality of coolant passages having parallel coolant flow, each coolant passage at least partially surrounding a respectively corresponding exhaust runner. The engine exhaust component may further include a coolant inlet manifold coupled to each of the coolant passages and a coolant outlet manifold coupled to each of the coolant passages. In this way, more even and controlled cooling can be provided.

19 Claims, 5 Drawing Sheets

ENGINE EXHAUST COMPONENT

BACKGROUND/SUMMARY

Various components in an engine's exhaust system such as exhaust conduits and emission control devices may become thermally degraded via high temperature exhaust gas, to reduce the temperature of the exhaust gas cooling systems have been incorporated into engines. For example, coolant jackets have been integrated into engine cylinder blocks and cylinder heads. The coolant jackets may be configured to reject heat from the engine. However, under certain operating conditions coolant jackets may not provide the desired amount of exhaust gas cooling. Therefore, high temperature exhaust gas may flow into the exhaust system from the engine and thermally damage various components such as exhaust conduits, catalysts, filters, etc.

U.S. Pat. No. 5,873,330 discloses an outboard marine engine that provides coolant to components downstream of the cylinder head. The engine includes a series of coolant passages surrounding a plurality of exhaust runners and an exhaust manifold. The inlet of the coolant passages is adjacent to a first outer exhaust runner and the outlet of the coolant passages is adjacent to a second outer exhaust runner. This coolant passage configuration flows coolant around the first outer exhaust runner, around the inner exhaust runners, and then around the second outer exhaust runner. Thus, coolant sequentially flows around each of the exhaust runners. Additionally, the general flow of coolant in the coolant passages is substantially perpendicular to the flow of exhaust gas through each of the exhaust runners. Furthermore, the cooling system disclosed in U.S. Pat. No. 5,873,330 draws water into the cooling system from the surrounding marine environment and expels water from the cooling system into the surrounding marine environment.

The Inventors have recognized several drawbacks to the engine cooling system disclosed in U.S. Pat. No. 5,873,330. When coolant is successively flowed around each of the exhaust runners, uneven cooling of the exhaust runners may occur. Moreover, when the coolant is flowed around the exhaust runners in a direction that is substantially perpendicular to the exhaust gas flow, the variance in exhaust runner cooling is exacerbated due to the flow pattern generated by such a configuration. As a result, the exhaust runners and the exhaust manifold may experience warping, as well as other types of thermal degradation. Furthermore, the cooling system disclosed in U.S. Pat. No. 5,873,330 may not be applicable to vehicles designed for land travel which cannot draw water from their surrounding environment.

As such in one approach, an engine exhaust component is provided. The engine exhaust component may include a plurality of coolant passages having parallel coolant flow, each coolant passage at least partially surrounding a respectively corresponding exhaust runner. The engine exhaust component may further include a coolant inlet manifold coupled to each of the coolant passages and a coolant outlet manifold coupled to each of the coolant passages.

In this way, coolant may be separately flowed around the exhaust runners and the parallel flow configuration decreases cooling variability between the exhaust runners. As a result, the likelihood of warping of the exhaust runners is reduced.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An engine exhaust component for an exhaust system of an engine is disclosed herein. The engine exhaust component includes a plurality of coolant passages. Each of the coolant passages at least partially surrounds a corresponding individual exhaust runner. Each of the coolant passages includes parallel coolant flow that may circumferentially enclose each respective exhaust runner (referred to as a tube-in-tube design). The tube-in-tube design increases the amount of heat that may be removed from the exhaust gas when compared to sequential flow of coolant around each exhaust runner in series. Moreover, the parallel coolant flow decreases the likelihood of warping of the exhaust runners by maintaining a more even temperature distribution across the runners, as the runners are formed as an integrated manifold. The engine exhaust component may further include a coolant inlet manifold configured to provide coolant to each of the coolant passages and a coolant outlet manifold configured to receive coolant from each of the coolant passages. Additionally, the coolant inlet and outlet manifolds may be fluidly coupled to a heat exchanger. Further in some embodiments an emission control device may be integrated into the engine exhaust component. Integrating the coolant passages, exhaust runners, and emission control device into a single component increases the compactness of the exhaust system as well as reduces manufacturing costs. In particular, such integration provides an unexpected benefit beyond in that heat can be better conducted from the emission control device area, through the housing, to the exhaust runner coolant passages, thus better controlling over-temperature of the emission control device.

Figure 1:
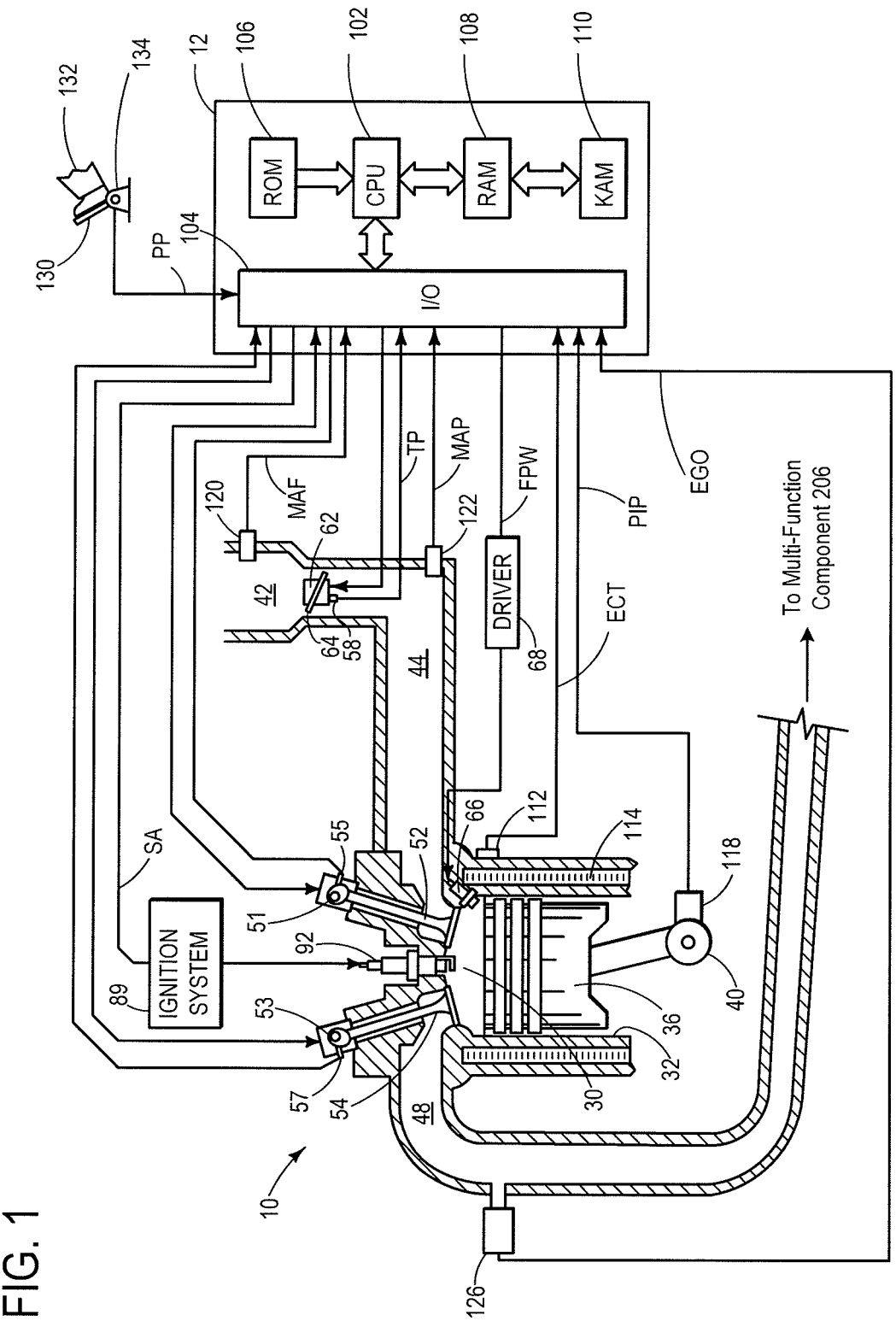
FIG. 1 shows a schematic depiction of an internal combustion engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust passage 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown intermediate of intake valve 52 and air intake zip tube 42. Fuel is delivered to fuel injector 66 by a fuel system (not shown) including a fuel tank, fuel pump, and fuel rail (not shown). The engine 10 of FIG. 1 is configured such that the fuel is injected directly into the engine cylinder, which is known to those skilled in the art as direct injection. Fuel injector 66 is supplied operating current from driver 68 which responds to controller 12. In addition, intake manifold 44 is shown communicating with optional electronic throttle 62 with throttle plate 64. In one example, a low pressure direct injection system may be used, where fuel pressure can be raised to approximately 20-30 bar. Alternatively, a high pressure, dual stage, fuel system may be used to generate higher fuel pressures. Additionally or alternatively a fuel injector may be positioned upstream of intake valve 52 and configured to inject fuel into the intake manifold, which is known to those skilled in the art as port injection.

Distributorless ignition system 89 provides an ignition spark to combustion chamber 30 via spark plug 92 in response to controller 12. Universal Exhaust Gas Oxygen (UEGO) sensor 126 is shown coupled to exhaust passage 48 upstream of engine exhaust component 206, discussed in greater detail herein with regard to FIG. 2. Alternatively, a two-state exhaust gas oxygen sensor may be substituted for UEGO sensor 126.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. However in other examples, fuel may be injected upstream of the intake valve and therefore delivered to the combustion chamber during the intake stroke. In a process hereinafter referred to as ignition, the injected fuel is ignited by known ignition means such as spark plug 92, resulting in combustion. Additionally or alternatively, compression ignition may be used to ignite the air/fuel mixture. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust passage 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
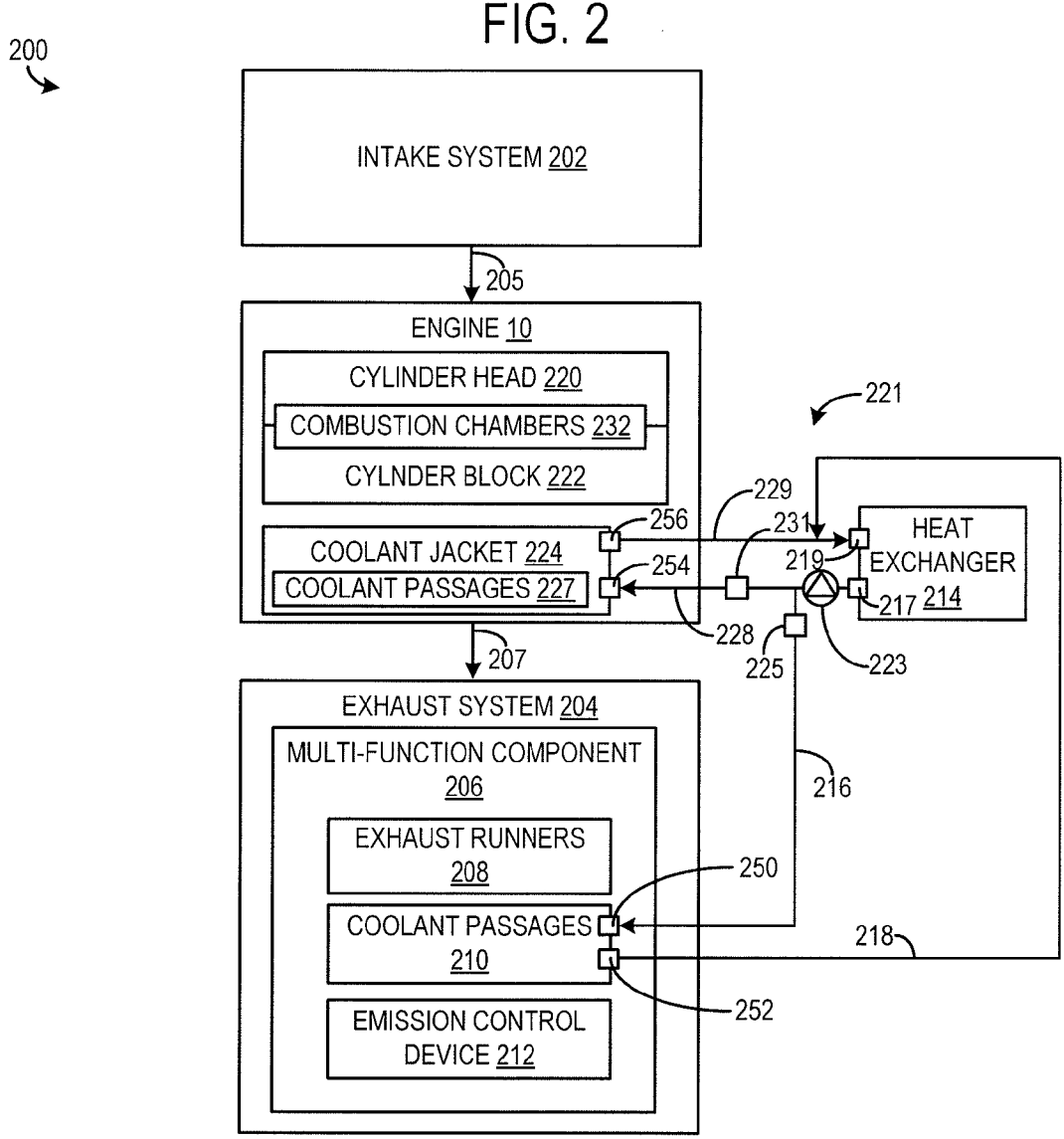
FIG. 2 shows a schematic depiction of a vehicle including the engine shown in FIG. 1, the vehicle including an engine exhaust component positioned in the exhaust system of the vehicle.

FIG. 2 shows a schematic depiction of a vehicle 200. As shown the vehicle includes an intake system 202, engine 10, and exhaust system 204. The intake system 202 may be configured to provide air to engine 10. Arrow 205 depicts the flow of air into the engine 10. As discussed above with regard to FIG. 1, the intake system may include various components such as throttle 62, intake manifold 44, intake valve 52, etc., discussed above with regard to FIG. 1.

The exhaust system 204 may be configured to receive exhaust gas from engine 10 and flow the exhaust gas to the atmosphere. Arrow 207 depicts the flow of exhaust gas from the engine 10 to the exhaust system 204. The exhaust system 204 may include a number of components such as exhaust valves, exhaust runners, an exhaust collector, an emission control device, etc. A portion of the exhaust system constituents may be integrated into the engine exhaust component 206. The constituents may include the exhaust runners 208 and a plurality of coolant passages 210 each coolant passage at least partially surrounding the exhaust runners. The exhaust runners may converge at an exhaust collector, discussed in greater detail herein with regard to FIG. 3. Additionally, the exhaust runners 208 may each be fluidly coupled to a separate combustion chamber in the engine 10. The engine exhaust component 206 may further include an emission control device 212. The emission control device may be a catalytic convertor such as a three-way type catalyst, in some embodiments. The catalytic convertor may include a plurality of bricks. However, in other embodiments the emission control device may be a particulate filter or other suitable emission control device.

The complexity of the manufacturing process may be simplified through the integration of the exhaust runners, coolant passages, coolant inlet and outlet manifolds, and catalyst or other emission control device into a single engine exhaust component. Additionally, such integration provides a particularly synergistic result when using parallel coolant passages for each runner. The parallel coolant passages decrease temperature variability between the exhaust runners. Therefore, uneven heating of the exhaust runners may be decreased, thereby decreasing the stresses on the exhaust runners and other constituents of the engine exhaust component caused by unequal expansion of the exhaust runners and/or other engine exhaust component constituents. It will be appreciated that the unequal expansion of the exhaust runners and other engine exhaust component constituents may cause unequal forces, bending moments, etc., on the exhaust system component.

The coolant passages 210 in the engine exhaust component 206 may be coupled to a heat exchanger 214. As shown coolant conduits represented via arrows 216 and 218 are provided to circulate coolant through heat exchanger 214 and coolant passages 210. Specifically, coolant conduit 216 is fluidly coupled to a coolant outlet 217 of heat exchanger 214 and an inlet 250 to coolant passages 210. On the other hand, coolant conduit 218 is fluidly coupled to a coolant inlet 219 of heat exchanger 214 and an outlet 252 to coolant passages 210. The directions of the arrows represent the general direction of coolant flow in the passages. It will be appreciated that coolant may circulate between the coolant passages and the heat exchanger 214 to remove heat from the coolant. The coolant passages 210, conduits (216 and 218), and heat exchanger 214 may be included in a coolant circuit 221. A pump 223 may be included in the coolant circuit formed via the coolant passages 210, input and output conduits (216 and 218), and heat exchanger 214. The pump 223 is configured to provide pressure head to the coolant circuit. The pump may be in adjusted via controller 12 shown in FIG. 1. Additionally, a valve 225 may be positioned in input conduit 216. In other embodiments the valve 225 may be positioned in the outlet conduit 218. The valve 225 may be configured to alter the amount of coolant flow into the coolant passages 210. The valve 225 may be adjusted via controller 12 shown in FIG. 1. However, in other embodiments valve 225 may be passively controlled or may not be included in the coolant circuit 221. Further still in other embodiments the valve 225 may be positioned in another suitable location with the first coolant circuit, such as in the input conduit 216.

As shown the engine 10 may include a cylinder head 220 and a cylinder block 222. The cylinder block and the cylinder head may form a plurality of combustion chambers 232. Combustion chamber 30, shown in FIG. 1, may be included in the plurality of combustion chambers 232. The cylinder head 220 and/or cylinder block 222 may include at least one coolant jacket 224. The coolant jacket 224 may include coolant passages traversing the cylinder head 220 and/or cylinder block 222. Additionally in other embodiments, the cylinder head and cylinder block may each include a separate coolant jacket having cooling passages. In such an embodiment the coolant jackets may or may not be fluidly coupled. The coolant jacket 224 may be fluidly coupled to heat exchanger 214 via coolant conduits represented via arrows 228 and 229. The coolant jacket 224 and the coolant conduits (228 and 229) may be included in coolant circuit 221. Coolant conduit 229 may be fluidly coupled to the coolant inlet 219 of the heat exchanger 214 and a coolant jacket inlet 254. On the other hand, the coolant conduit 228 may be fluidly coupled to the coolant outlet 217 of the heat exchanger 214 and a coolant jacket outlet 256. It will be appreciated that the general direction of coolant flow correspond to the direction of arrows 228 and 229. The heat exchanger 214 is further configured to remove heat from the coolant circulated in the coolant jacket 224. As depicted, valve 231 is positioned in coolant conduit 228. However in other embodiments, valve 231 may be positioned in another suitable location such as in coolant conduit 229. Valve 231 may be configured to adjust the flow of coolant into coolant jacket 224. The valve 231 may be adjusted via controller 12 shown in FIG. 1. However, in other embodiments valve may be passively controlled or may not be included in the coolant circuit 221. The coolant flow provided to the coolant jacket 224 may be adjusted based on various engine and/or vehicle operating conditions.

In the depicted embodiment, the conduits coupled to coolant inlet 219 and coolant outlet 217 of heat exchanger 214 branch to circulate coolant through coolant passages 210 and coolant jacket 224. However, in other embodiments coolant passages 210 and coolant jacket 224 may each be fluidly coupled to a separate heat exchanger. Still further in other embodiments coolant passages 210 and coolant jacket 224 may each be fluidly coupled to separate coolant inlets and outlets in the heat exchanger 214. It will be appreciated that a multitude of alternate suitable coolant circuit configurations may be used in other embodiments.

Figure 3:
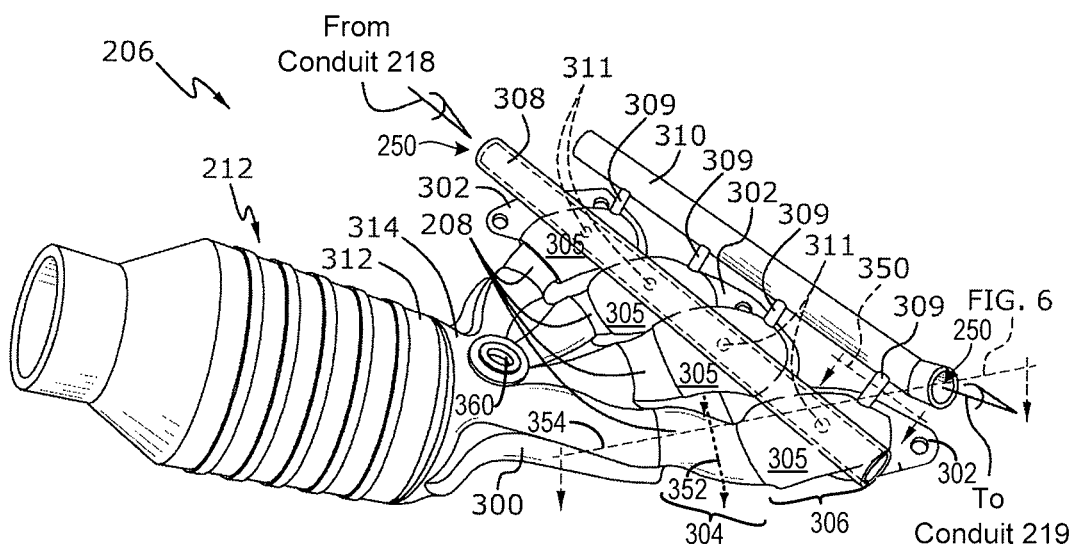
FIG. 3 shows an illustration of an example engine exhaust component.

FIG. 3 shows a perspective view of the engine exhaust component 206. As shown the engine exhaust component includes a plurality of exhaust runners 208 converging at an exhaust collector 300. Thus, the plurality of exhaust runners 208 are fluidly coupled to the exhaust collector 300. The exhaust runners 208 may be fluidly separated. That is to say that exhaust gas may not flow between the exhaust runners. One or more flange(s) 302 of the exhaust runner may be used to attach the engine exhaust component 206 to the cylinder head 220, shown in FIG. 2. Seals may be positioned between the cylinder head 220 and the flange(s) 302 to reduce exhaust gas leaks in the exhaust system. It will be appreciated that the engine exhaust component 206 is external to the cylinder head 220.

When the exhaust runners 208 are coupled to one another via the exhaust collector 300, uneven heating may cause increased stressed at the exhaust collector due to unequal expansion of the different exhaust runners. The unequal expansion may apply unequal forces and therefore bending moments on the various components integrated into the engine exhaust component 206. As a result warping and/or other types of component degradation may occur. Therefore, the engine exhaust component 206 has been designed with various cooling features to reduce temperature variability between the exhaust runners.

The exhaust runners 208 may each include a first section 304 having one of coolant passages 210 circumferentially enclosing the exhaust runner, as depicted. In this way, the coolant passages 210 defined by coolant passage housings 305 at least partially traverse the exhaust runners 208. In other embodiments, the coolant passages 210 defined by the coolant passage housings 305 may only partially enclose the exhaust runners 208. Furthermore, the coolant passages have parallel coolant flow. Parallel coolant flow is defined as coolant flow in which coolant separately flows through a plurality of coolant passages without any coolant traveling between the coolant passages. In this way, each coolant passage is self contained and coolant does not flow between the coolant passages 210 defined by the coolant passage housings 305. Therefore, coolant may flow from a coolant inlet manifold 308 into each coolant conduit via separate coolant inlets, flow separately through the coolant passages 210, and flow into a coolant outlet manifold 310 via separate coolant outlets coupled to each coolant passage. The coolant passages 210 are discussed in greater detail herein with regard to FIG. 4. Additionally, a portion of each of first sections in the exhaust runners 208 and therefore coolant passages 210 may be parallel. That is to say that the central axis of the runners may be parallel in a portion of the first section. The exhaust runners 208 may each further include a second section 306 that is not enclosed via a coolant passage. Each of the exhaust runners may extend towards the exhaust collector 300 in the second sections 306.

A coolant inlet manifold 308, depicted in the form of a rail, may be positioned adjacent to the exhaust collector 300. The coolant inlet manifold 308 may be configured to provide each coolant passage in the plurality of coolant passages 210 with coolant via coolant inlets 311. The coolant inlet manifold 308 may receive coolant from input conduit 218 shown in FIG. 2. In some examples, the coolant inlet manifold 308 may be positioned adjacent to a first end of each of the coolant passages 210.

A coolant outlet manifold 310, depicted in the form of a rail, may be positioned adjacent to the flanges 302. The coolant outlet manifold may be configured to receive coolant from each of the coolant passages 210 and provide coolant to output conduit 216 shown in FIG. 2. Coolant outlets 309 fluidly couple each of the coolant passages 210 to the coolant outlet manifold 310. Each of the coolant outlets 309 may be radially and longitudinally offset from a corresponding coolant inlet included in coolant inlets 311. However, in other embodiments, a portion of the coolant outlets 309 may be radially and longitudinally offset from the coolant inlets 311 or the coolant outlets 309 may not be longitudinally and/or radially offset from the coolant inlets 311. When the coolant inlets 311 and the coolant outlets 309 are radially offset, the velocity of the tangential coolant flow within the coolant passages 210 may be increased when compared to other designs in which the coolant inlets and outlets are not radially offset. In this way, coolant may travel around the coolant passages 210 with increased velocity, decreasing the likelihood of slow moving coolant regions forming in the coolant passages which may lead to vapor formation in the coolant passages.

Further in other embodiments, coolant may flow into the coolant passages 210 from the coolant inlets 311 in a direction tangential to the housing of the exhaust runners 208. Furthermore, the coolant outlets 309 may also be tangentially arranged with respect to the housing of the exhaust runners 208. As a result the tangential velocity of the coolant in the coolant passages 210 may be further increased. The increased tangential velocity of the coolant in the coolant passages 210 enables a greater amount of coolant to flow through portions of the coolant passages which may be susceptible to low flow conditions and/or high temperatures which may cause vapor formation in the coolant. In this way, the likelihood of coolant vapor formation in portions of the coolant passages is reduced, thereby improving cooling operation.

Further in some embodiments, the ends of the coolant passages 210 may be positioned adjacent to the flanges 302 and the cylinder head 220. When the coolant passage are constructed in this configuration, the amount of heat transferred to the cylinder head 220 through flanges 302 may be increased. As a result, the temperature of the coolant in the coolant passages 210 is reduced thereby decreasing vapor formation in the coolant passages 210. Still further in some embodiments, the ends of the coolant passage housing may be tapered, further decreasing the likelihood of vapor formation in the ends of the coolant passages 210. It will be appreciated that vapor formation may degrade operation of the cooling system via an increase in coolant temperature, increased temperature variability within the coolant passages, as well as decreased pumping efficiency.

Coolant may separately flow through each coolant passage in a parallel, as previously discussed. By separating the coolant flow temperature the variability within the exhaust runners may be reduced thereby reducing the likelihood of the warping or other thermal degradation of the engine exhaust component 206 when compared to other designs such as a cross flow design. In some examples, the coolant outlet manifold 310 may be positioned adjacent to a second end of each of the coolant passages 210.

Moreover, the general flow of coolant through the coolant passages 210 may be substantially opposing the general flow of exhaust gas through the exhaust runners 208. This type of flow configuration is referred to as counter-flow. It will be appreciated that the opposing flow configuration may increase heat transfer from the exhaust gas to the coolant when compared to other type of designs such as co-current flow heat exchangers. However in other embodiments the engine exhaust component may have co-current flow. For example, the coolant inlets 311 included in the coolant inlet manifold 308 may be positioned adjacent to the flanges 302 and the coolant outlets 309 included in the coolant outlet manifold 310 may be positioned adjacent to the emission control device 212.

Furthermore, the coolant outlets 309 may be positioned vertically above the coolant inlets 311, decreasing the likelihood of gas bubbles when coolant is initially introduced into the coolant passages. As a result, operation of the cooling system may be enhanced.

As shown, the emission control device 212 may be directly coupled to the exhaust collector 300. Thus, the housing 312 of the emission control device 212 and the housing 314 of the exhaust collector 300 form a continuous external surface. The housing 305 of the coolant passages 210 may also form a continuous external surface with the housing 312 and the housing 314. In this way, various parts of the engine exhaust component 206 may share a common housing, increasing the component's compactness. However in other embodiments alternate suitable configurations are possible.

Various sensors may be attached to the engine exhaust component 206. The sensors may be in communication with controller 12 discussed above with regard to FIG. 1. For example, a temperature sensor may be positioned at the inlet of the emission control device 212. In the depicted embodiment the engine exhaust component 206 includes a sensor boss 360 coupled into a confluence of the plurality of exhaust runners 208 downstream of the plurality of coolant passages 210. However in other embodiments the engine exhaust component 206 may not include the sensor boss 360.

Additionally, one or more flow sensors may be coupled to the coolant inlet and/or outlet manifolds. It will be appreciated that the sensors in conjunction with the controller may be used to implement various control strategies. For example, the amount of coolant flow through the coolant passages 210 may be adjusted based on the temperature of the emission control device 212. Specifically a feedback type control strategy may be utilized. For example, the emission control device 212 may have a desired operating temperature or temperature range. Therefore if it is determined that the emission control device 212 is experiencing an over-temperature condition the flowrate of the coolant through the coolant passages 210 may be increased via a control system including controller 12, pump 223, and/or valve 225. In this way, flow through the coolant passages may be increased when the emission control device 212 is above a threshold temperature. On the other hand, if it determined that an under-temperature condition is present in the emission control device the flowrate of the coolant through the coolant passages may be decreased via the control system. Furthermore, the flowrate of the coolant through the coolant passages 210 may be adjusted based on the temperature of engine 10. For example, the flowrate of coolant through the coolant passages may be increased via the control system when the temperature of the engine 10 is above a threshold value. It will be appreciated that other types of control strategies may be utilized to control the flowrate of coolant through coolant passages 210 such as a feedforward control strategy, a proportional-integral-derivative (PID) control strategy, etc. Cutting plane 350 defines the cross-section shown in FIG. 4, cutting plane 352 defines the cross-section shown in FIG. 5, and cutting plane 354 defines the cross-section shown in FIG. 6.

Figure 4:
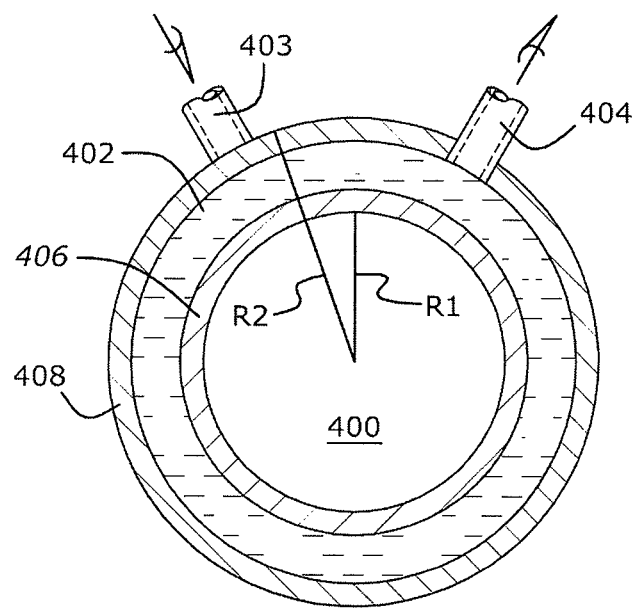
FIG. 4 shows a cross-sectional view of a portion of the engine exhaust component shown in FIG. 3.

FIG. 4 shows a cross-sectional view of a portion of the engine exhaust component 206, shown in FIG. 3. A single exhaust runner, included in the plurality of exhaust runners 208 shown in FIG. 3, is depicted in FIG. 4, the exhaust runner including exhaust runner passage 400 and exhaust runner housing 406 defining the periphery of the exhaust runner passage 400. A coolant passage housing 408 defines the periphery of a coolant passage 402, included in the plurality of coolant passages 210 is also shown in FIG. 4. Additionally, the exhaust runner housing 406 is circumferentially enclosed via the coolant passage 402. However as previously discussed the exhaust runner may only be partially enclosed via the coolant passage in other embodiments.

FIG. 4 further shows coolant entering the coolant passage 402 via coolant inlet 403 included in the coolant inlet manifold 308 shown in FIG. 3. Likewise coolant exits coolant passage 402 via coolant outlet 404 included in the coolant outlet manifold 310 shown in FIG. 3. In this way, coolant may be flowed through the coolant passage 402.

The exhaust gas flowing through the exhaust runner passage 400 may generally flow into the page. On the other hand, the coolant flowing through coolant passage 402 may generally flow out of the page. In this way, the flow of the fluid may oppose each-other, as previously discussed. In some examples the ratio (R1/R2) between the radius R1 of the exhaust runner passage 400 and radius R2 of the coolant passage 402 may be between 0.6 and 0.7. Additionally in other embodiments, supports (not shown) may extend from the exhaust runner housing 406 to the coolant passage housing 408, providing increased structural support to the coolant passage housing 408. Furthermore, the exhaust runner housing 406 and/or the coolant passage housing 408 may be constructed out of a suitable material such as steel, aluminum, a polymer, etc. Although a single exhaust runner is shown in FIG. 4 it will be appreciated that the other exhaust runners included in the engine exhaust component 206 may have a similar construction.

Figure 5:
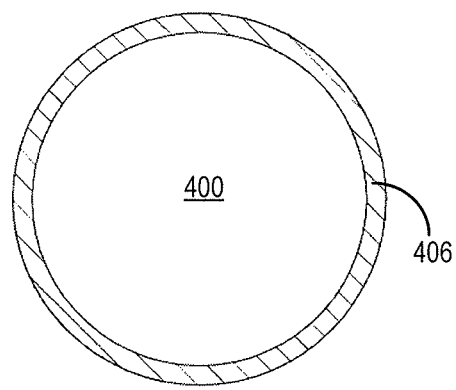
FIGS. 5 and 6 show other cross-sectional views of the engine exhaust component shown in FIG. 3.

FIG. 5 shows another cross-sectional view of the engine exhaust component 206, shown in FIG. 3. The cross-section is taken at a location in the exhaust runner downstream of a coolant passage included in the plurality of coolant passages 210, shown in FIG. 3. Therefore, in this section coolant passage 402, shown in FIG. 4, does not surround the exhaust runner passage 400 and the exhaust runner housing 406 is the external housing. Thus, each exhaust runner may include a portion surrounded by a coolant passage and a portion that is not surrounded by a coolant passage.

Figure 6:
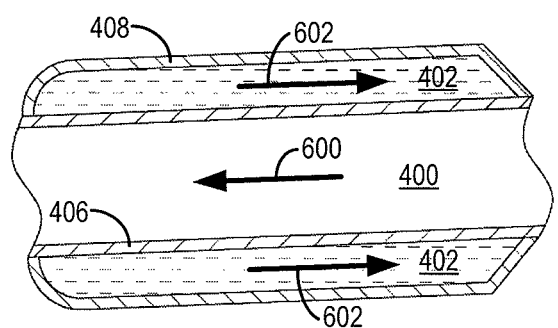

FIG. 6 shows another cross-sectional view of the engine exhaust component shown in FIG. 3. The general flow of exhaust gas through the exhaust runner passage 400 is indicated with arrow 600. Furthermore, the general direction of coolant flow through the coolant passage 402 is indicated with arrows 602. As depicted, coolant may generally flow through coolant passage 402 in the opposite direction of exhaust gas flow through the exhaust runner passage 400. In this way, the cooling of the exhaust gas may be increased when compared to a design which employs co-current coolant flow. However in other embodiments, the coolant and exhaust gas may generally flow in the same direction.

Figure 7:
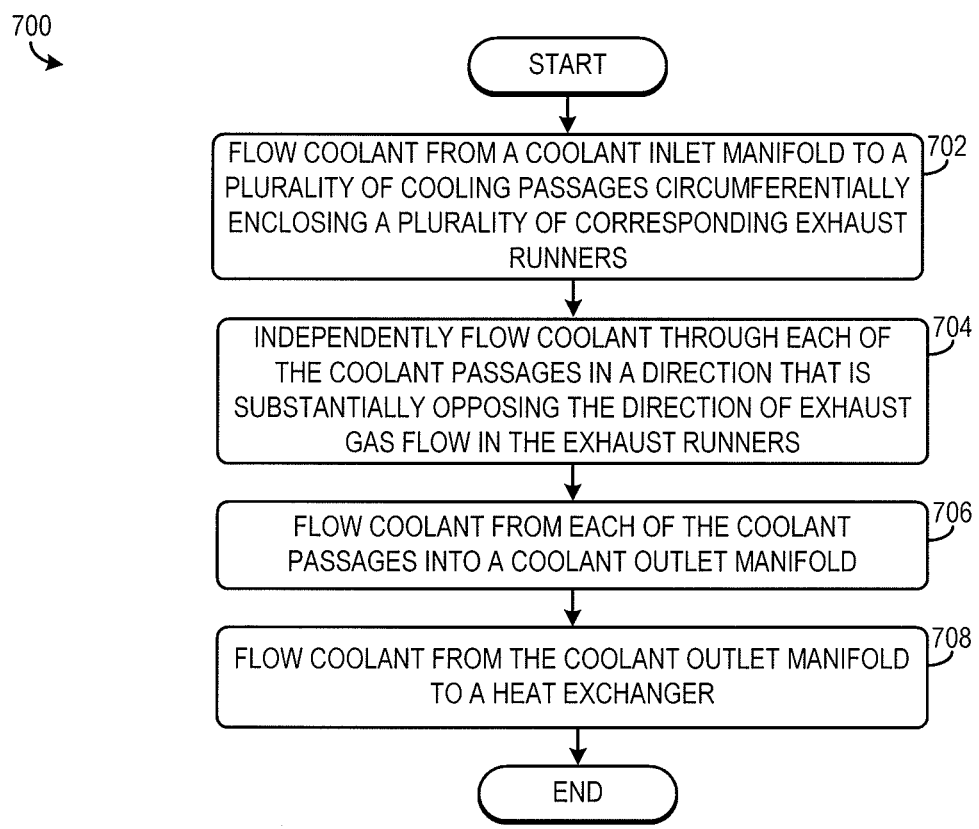
FIG. 7 shows a method for operation of a cooling system in a vehicle.

FIG. 7 shows a method 700 for operating a cooling system in a vehicle. Method 700 may be implemented by the vehicle, systems, components, devices, etc., described above or alternatively may be implemented via another suitable vehicle, systems, components, devices, etc.

At 702 the method includes flowing coolant from a coolant inlet manifold to a plurality of cooling passages circumferentially enclosing a plurality of corresponding exhaust runners. Moving to 704 the method includes independently flowing coolant through each of the coolant passages in a direction that is substantially opposing the direction of exhaust gas flow in the exhaust runners. Next at 706 the method includes flowing coolant from each of the coolant passages into a coolant outlet manifold. At 708 the method further includes flowing coolant from the coolant outlet manifold to a heat exchanger.

The systems and methods described herein enable the temperature of the exhaust gas downstream of an engine exhaust component including exhaust runners coupled to a cylinder head in an engine to be reduced. As a result the likelihood of thermal degradation of the exhaust runners as well as other components in the exhaust system downstream of the exhaust runners may be reduced, thereby increasing the exhaust system's longevity. Furthermore, the temperature of the exhaust gas flowing through the multifunction component may be adjusted to improve catalyst operation and reduce the need for engine-based exhaust cooling tactics (e.g., fuel enrichment under heavy load, etc). Moreover, the compactness of the engine exhaust component achieved through integration of various elements into a single component enables the profile of the exhaust system to be reduced. Further, the integration of the elements into a single engine exhaust component also enables the manufacturing process of the component to be simplified. As a result the manufacturing cost is reduced.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. An engine exhaust component, comprising:
a plurality of coolant passages having parallel coolant flow, each coolant passage at least partially surrounding a respectively corresponding exhaust runner;
a coolant inlet manifold coupled to each of the coolant passages; and
a coolant outlet manifold coupled to each of the coolant passages and spaced away from each exhaust runner, parallel coolant flow from the coolant inlet manifold to the coolant outlet manifold in an opposite direction of exhaust gas flow.

2. The engine exhaust component of claim 1, wherein each coolant passage circumferentially encloses a respective exhaust runner, and wherein the coolant outlet manifold is coupled to each of the coolant passages upstream of a confluence of the exhaust runners.

3. The engine exhaust component of claim 1, wherein each coolant passage includes an inlet coupled to the coolant inlet manifold and an outlet coupled to the coolant outlet manifold, the inlet radially and longitudinally offset from the outlet.

4. The engine exhaust component of claim 1, wherein the coolant inlet and outlet manifolds are fluidly coupled to a heat exchanger via a coolant circuit.

5. The engine exhaust component of claim 4, wherein the heat exchanger is fluidly coupled to an inlet and outlet of a coolant jacket in the engine.

6. The engine exhaust component of claim 1, further comprising an emission control device positioned downstream of an exhaust collector fluidly coupled to the exhaust runners.

7. The engine exhaust component of claim 6, wherein the emission control device is a catalyst.

8. The engine exhaust component of claim 7, wherein a continuous external surface forms a housing for the emission control device and the exhaust collector.

9. The engine exhaust component of claim 8, wherein the housing includes the plurality of coolant passages.

10. The component of claim 9, further including a sensor boss coupled into a confluence of the plurality of exhaust runners downstream of the plurality of coolant passages.

11. The engine exhaust component of claim 1, further comprising a control system configured to increase the coolant flow through the coolant passages when a temperature is above a threshold.

12. The engine exhaust component of claim 11, further comprising an emission control device positioned downstream of an exhaust collector fluidly coupled to the exhaust runners, wherein the control system is configured to increase the coolant flow through the coolant passages when temperature of the emission control device is above the threshold.

13. The engine exhaust component of claim 1, wherein the engine exhaust component is coupled to a cylinder head of the engine.

14. An engine exhaust component, comprising:
- a plurality of exhaust runners, each exhaust runner fluidly coupled to a combustion chamber in the engine;
- a plurality of coolant passages coupled in parallel and each circumferentially enclosing respective exhaust runners;
- a coolant inlet manifold including a plurality of coolant inlets each fluidly coupled to separate, respective, coolant passages, the inlet manifold positioned above each runner; and
- a coolant outlet manifold including a plurality of coolant outlets each fluidly coupled to separate, respective, coolant passages, the coolant outlet manifold positioned above each runner and in parallel with the inlet manifold, or perpendicular to the runners.

15. The engine exhaust component of claim 14, wherein the plurality of exhaust runners include one or more flanges coupled to a cylinder head included in the engine.

16. The engine exhaust component of claim 14, further comprising an emission control device integrated into a housing of the coolant passages.

17. The engine exhaust component of claim 14, wherein coolant in the coolant passages flows in a substantially opposite direction of a flow of the exhaust gas in the exhaust runners.

18. A method for operating a cooling system in a vehicle comprising:
- flowing coolant from a coolant inlet manifold to a plurality of cooling passages each circumferentially enclosing a respective corresponding exhaust runner, the coolant inlet manifold spaced away from the exhaust runners;
- flowing coolant in a parallel configuration through each of the coolant passages from the coolant inlet manifold to a coolant outlet manifold in a direction that is substantially opposing a direction of exhaust gas flow in the exhaust runners; and
- flowing coolant from each of the coolant passages into the coolant outlet manifold at locations upstream of a confluence of the exhaust runners.

19. The method of claim 18, further comprising flowing coolant from the coolant outlet manifold to a heat exchanger.

* * * * *